(12) United States Patent
Wilson et al.

(10) Patent No.: US 6,255,012 B1
(45) Date of Patent: Jul. 3, 2001

(54) PLEATED METAL BIPOLAR ASSEMBLY

(75) Inventors: Mahlon S. Wilson; Christine Zawodzinski, both of Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/444,216

(22) Filed: Nov. 19, 1999

(51) Int. Cl.$^7$ .................................................. H01M 2/14
(52) U.S. Cl. ................... 429/38; 429/39; 429/34; 429/12; 429/26; 429/210
(58) Field of Search ................. 429/34, 12, 26, 429/38, 39, 13, 14, 210

(56) References Cited

U.S. PATENT DOCUMENTS

| | | |
|---|---|---|
| 3,880,670 * | 4/1975 | Shinn ................................. 136/86 R |
| 4,755,272 | 7/1988 | Plowman . |
| 5,541,015 * | 7/1996 | Tajima et al. ......................... 429/26 |
| 5,789,093 * | 8/1998 | Malhi ..................................... 429/34 |
| 5,798,187 | 8/1998 | Wilson . |
| 5,798,188 | 8/1998 | Mukohyama . |

* cited by examiner

Primary Examiner—Stephen Kalafut
Assistant Examiner—Angela J. Martin
(74) Attorney, Agent, or Firm—Ray G. Wilson

(57) ABSTRACT

A thin low-cost bipolar plate for an electrochemical cell is formed from a polymer support plate with first flow channels on a first side of the support plate and second flow channels on a second side of the support plate, where the first flow channels and second flow channels have intersecting locations and have a depth effective to form openings through the support plate at the intersecting locations. A first foil of electrically conductive material is pressed into the first flow channels. A second foil of electrically conductive material pressed into the second flow channels so that electrical contact is made between the first and second foils at the openings through the support plate. A particular application of the bipolar plate is in polymer electrolyte fuel cells.

11 Claims, 3 Drawing Sheets

PLEATED METAL BIPOLAR ASSEMBLY

STATEMENT REGARDING FEDERAL RIGHTS

This invention was made with government support under Contract No. W7405-ENG-36 awarded by the U.S. Department of Energy. The government has certain rights in the invention.

FIELD OF THE INVENTION

The present invention relates generally to electrochemical cells, and, more particularly, to bipolar plates for use in electrochemical cells.

BACKGROUND OF THE INVENTION

Electrochemical cells, e.g., fuel cells, are typically formed with an ionic membrane with electrocatalysts disposed on the membrane surfaces to catalyze the appropriate oxidation and reduction reactions occurring on the surfaces. Conductive gas permeable surfaces, typically carbon cloth, contact the membrane surfaces to establish an external current flow. Anode and cathode plates then contact the conductive surfaces to provide external electrical connections. The anode and cathode plates also provide for the flow of fuel and oxidizing gases, respectively, over the membrane surfaces. The individual electrochemical cells are typically connected in series to provide cell stacks that obtain useful power output.

In a cell stack, the anode plate of one cell is also the cathode plate of an adjacent cell, i.e., a bipolar plate. Bipolar plates are also structural components of a cell stack since the cells are typically subject to compression forces that maintain the entire assembly internally sealed and with good electrical contact along the series of cells. In addition, bipolar plates separate the fuel and oxidizing reaction gases on opposite sides of the plate. Such bipolar plates are often formed of electrically conductive coated solid metals, carbon, or graphite/graphite composites that must be machined to provide channels for the required flow fields on both sides of a plate and provide a minimum thickness for structural support. These plates are expensive to produce since the channels must be machined and are heavy components of the resulting cell stack.

Although corrosion is an important concern, metal is of interest for bipolar plates because of its potential for low-cost manufacture. One approach to protecting metal hardware from corrosion is to use coatings, such as noble metals, or electrically conductive passivation layers, such as titanium nitride or silicon carbide. Another approach is to use uncoated metal alloys that allow a certain amount of fuel cell operation before the cell performance is unduly affected. For example, we have shown that a fuel cell can be operated using untreated 316 stainless steel (316 SS) for up to 2,000 hours before the performance degrades (U. S. Pat. No. 5,798,187 issued Aug. 25, 1998).

The primary mechanism for the degradation is the uptake of metal ions by the polymer electrolyte membrane, which affects the ionic conductivity of the electrolyte. In addition, the metal ions that make their way to the catalyst layer may possibly alter the activity of the catalyst. A number of other "stainless steel" alloys are more noble than the 316 SS, yet still relatively low-cost, and thus promise to extend the useful lifetime. However, 316 SS has been used despite the durability limitations because of its ready availability in numerous forms and foil thicknesses.

Beyond standard machining, which is obviously too expensive for mass production, flow-field channels can be formed into metal plates by a number of potentially lower cost methods, such as chemical etching, pressure jet machining, etc. While these processes can provide a lower cost, a fair amount of potentially expensive material is wasted and the resulting plates are likely to be heavy (unless, of course, aluminum or titanium are used).

Preferably, a relatively thin metal foil could be stamped or otherwise formed into a thin convoluted structure that defines the flow-field channels on either side. The simplest manifestation would be a corrugated plate. For example, U.S. Pat. No. 4,755,272, issued Jul. 5, 1988, teaches a corrugated, electrically conductive sheet for use as a bipolar plate, where one set of channels defined by the corrugations is adjacent the anode and the other set of channels is adjacent the cathode.

Some difficulties arise, however, with the corrugated configuration. It is awkward to manifold the anode and cathode reactant flows to the opposing sides of the corrugated sheet. More importantly, there are practical limitations to this approach with polymer electrolyte fuel cells. Compared to other types of fuel cells and industrial polymer electrolyte reactors, the performance of the polymer electrolyte fuel cell is substantially enhanced with the provision of high clamping pressures.

In conventional flow-field designs, the membrane/ electrode assembly (MEA) must span the flow channels. The clamping force on the MEA becomes more uniform and effective as the channels become narrower. However, there are practical limitations due to excessive pressure drops, ease of plate fabrication, ease of water removal, etc. As a result, most conventional flow-field designs use channels that are on the order of only 1 mm in width and depth. One consideration on the depth of the channel is the thickness of the bipolar plate that is required to accommodate the channels, because the channel depths determine the minimum thickness of the plate (minimal plate thicknesses are desirable to maximize stack power densities).

These fine structures pose a challenge for conventional metal forming processes such as stamping or hydroforming. Foils that are thin enough to be readily formed into the requisite intricate structures can not easily provide unsupported structures that can withstand the high clamping pressures desirable for polymer electrolyte fuel cells without deforming or collapsing.

It is thus an objective of this invention to provide a bipolar plate with the structural integrity to withstand high clamping pressure with the use of metal foils that are thin enough to be readily stamped, pleated, or otherwise formed.

This is accomplished in this invention with the use of a structural element, preferably of a plastic material, that supports the metal foils and also defines the sealing and manifolding areas. The result is also a lightweight, thin and durable bipolar plate.

Both the cost and the weight of the unit cells are important for a number of fuel cell stack applications such as transportation or portable power. Consequently, the present invention is directed to a lightweight, inexpensive bipolar plate.

While different in materials and configuration from the present invention, a plastic/metal combination bipolar plate is also taught by U.S. Pat. No. 5,798,188, issued Aug. 25, 1998. Here, the bipolar plates are formed of molded polymer projections that are mounted on a flat conductive plate to form oxidant and fuel flow channels on both sides of the plate without any need to machine the channels. The polymer projections and exposed areas of the conductive plate are coated with a conductive material to form the anode and cathode electrodes.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention includes a thin low-cost bipolar plate for an electrochemical cell. A polymer support plate defines first flow channels on a first side of the support plate and second flow channels on a second side of the support plate, where the first flow channels and second flow channels have intersecting locations and have a depth effective to form openings through the support plate at the intersecting locations. A first foil of electrically conductive material is pressed into the first flow channels. A second foil of electrically conductive material is pressed into the second flow channels so that electrical contact is made between the first and second foils at the opening through the support plate.

A particular application of the bipolar plate is in polymer electrolyte fuel cells.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

In accordance with the present invention, bipolar plates for electrochemical cells are formed from conductive foils that are supported by a polymer support plate. The polymer support plate can be readily configured with flow fields during a manufacturing process, such as injection molding, without the need for machining. Likewise, the conductive foils can be stamped or corrugated to matching configurations without any need for machining. The resulting structure is inexpensive to form and is compact and lightweight.

Figure 1:
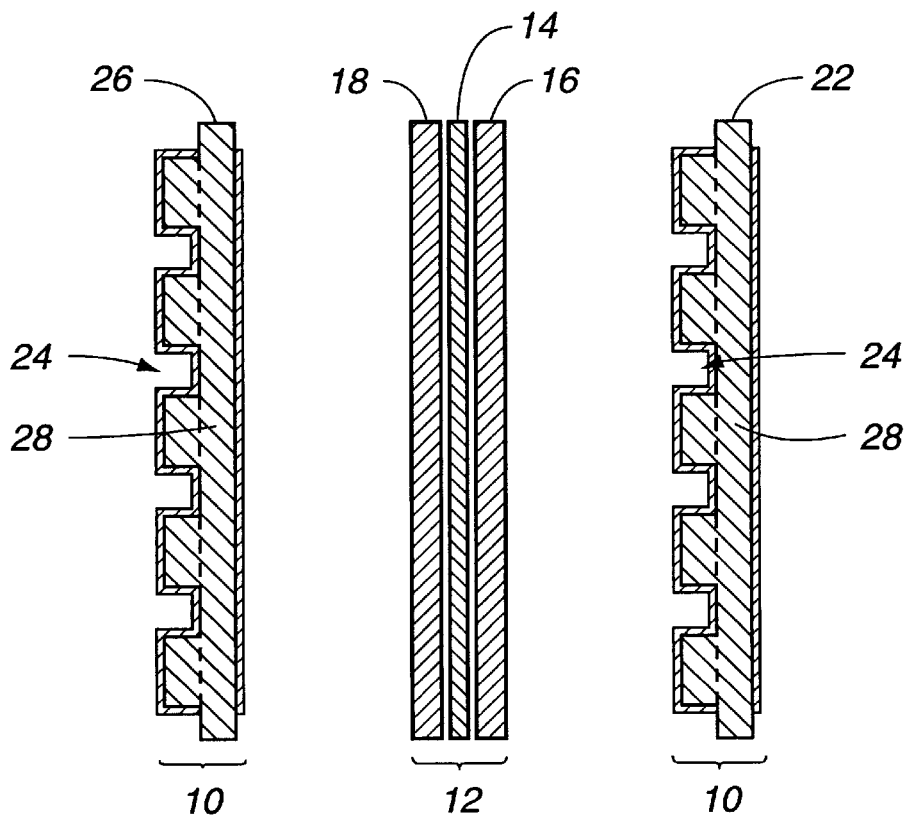
FIG. 1 is an exploded view of an electrochemical cell, particularly a fuel cell, having bipolar plates according to one embodiment of the present invention.
Figure 2:
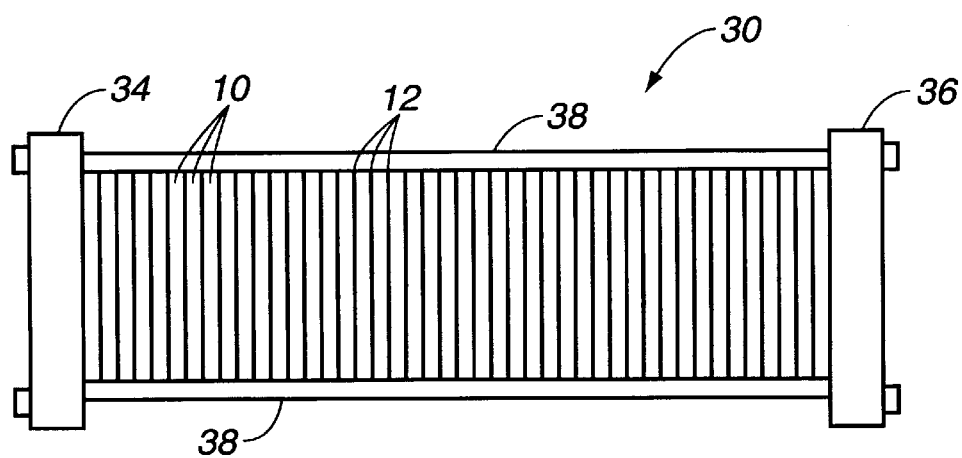
FIG. 2 is a fuel cell stack formed from the fuel cells depicted in FIG. 1.

FIGS. 1 and 2 generically depict a fuel cell assembly and a fuel cell stack and illustrate the context for utilizing the benefits of the present invention. FIG. 1 is an exploded view, in cross-section, of a fuel cell assembly. Membrane electrode assembly 12 is formed from a proton conducting membrane 14, which is preferably a polymer electrolyte, that is placed between anode 16 and cathode 18. Membrane electrode assembly 12 is placed between conductive plates 22 and 26, which supply various fluids across the face of electrodes 16 and 18 through flow field passages 24 and 28, respectively (see also FIG. 5).

In many stack designs, cooling plates are periodically interspersed between the fuel cell assemblies. Instead of a reactant, coolant is distributed in some manner across the plate. Since the cooling plates basically need to satisfy the same requirements as the bipolar plates (e.g., conductivity, strength, flow distribution, etc.) and may be configured such that one side distributes coolant and the other side reactant, etc., such components will also be considered under the general term "bipolar plates".

Figure 3:
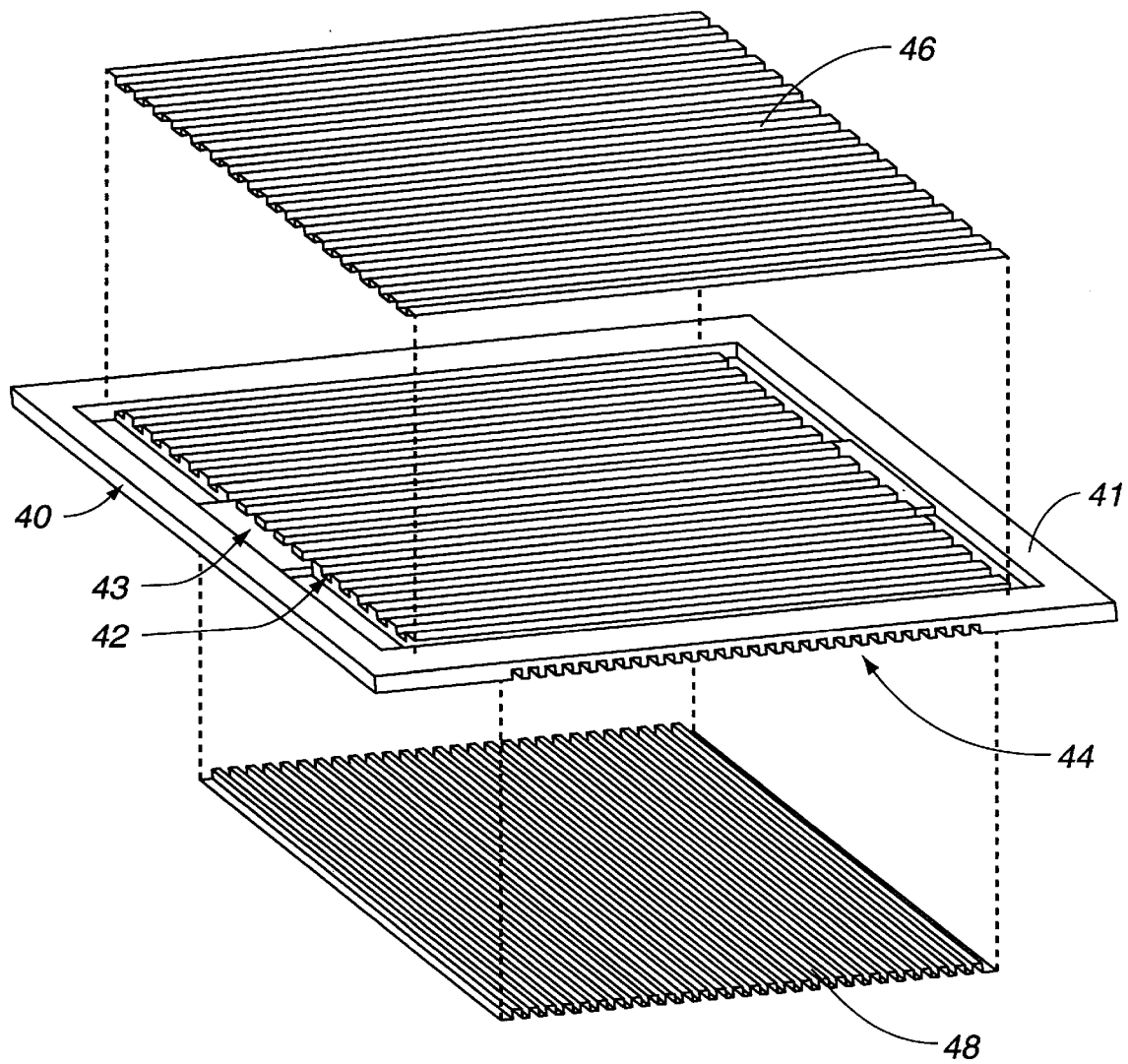
FIG. 3 is an exploded view of a bipolar plate according to one embodiment of the present invention.
Figure 4:
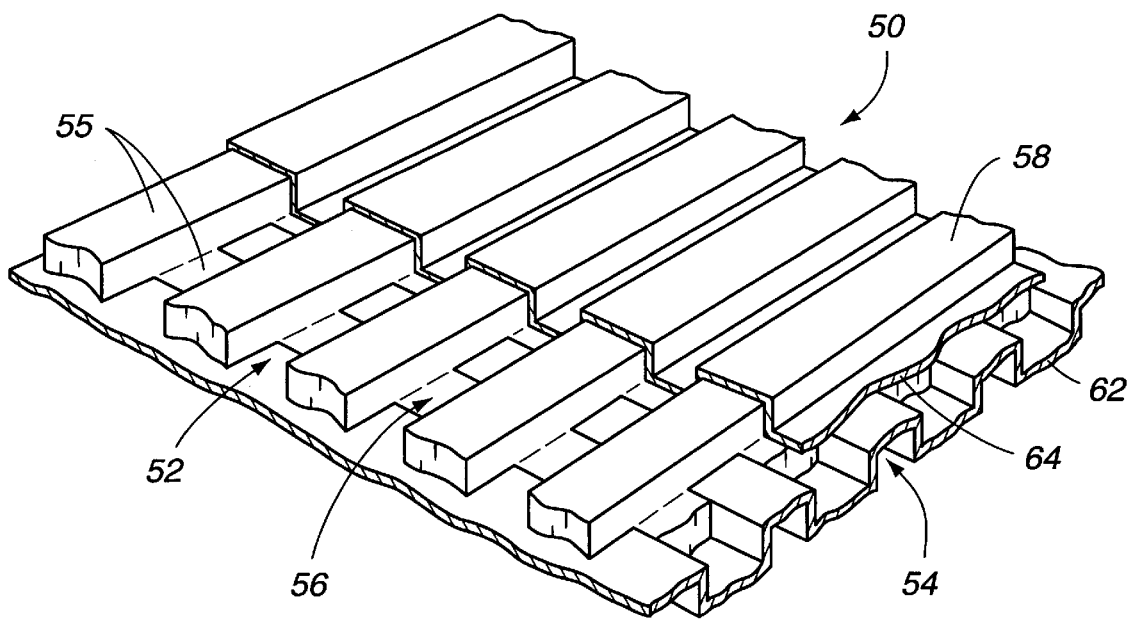
FIG. 4 is an isometric plan view of the bipolar plate shown in FIG. 3.
Figure 5:
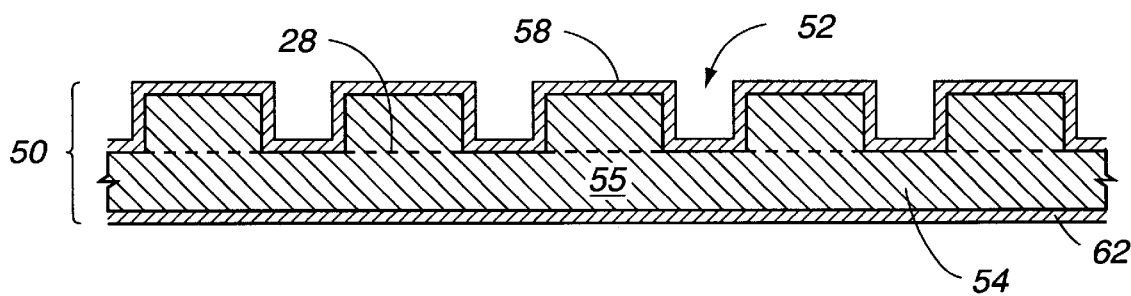
FIG. 5 is a cross-sectional view of the assembled bipolar plate shown in FIG. 3.

Conductive plates 22 and 26 may be configured as bipolar plates 10 by incorporating anode and cathode flow field passages 24 and 28 into opposite faces of each plate, which is formed from conductive foils that are pressed into a polymer support plate, as shown in FIGS. 3, 4, and 5. Such plates are conventionally known as bipolar plates since the plates generally contact the cathode of one cell and the anode of an adjacent cell and electrically connect adjacent fuel cells in series when a fuel cell stack is formed, as shown in FIG. 2. Anodes 16 and 18 may overlap the conductive foil area of bipolar plates 10 to electrically cloak the foils from possible shunt currents through manifold regions of bipolar plates 10.

In FIG. 2, a plurality of membrane electrode assemblies 12 are placed alternately in series with bipolar plates 10, which serve to electrically connect in series anodes 16 and cathodes 18 (see FIG. 1 for fuel cell assembly references) to form fuel cell stack 30. End plates 34 and 36 contact end ones of bipolar plates 10 and tie rods 38 are tightened to compress the stack of bipolar plates 10 and membrane electrode assemblies 12 between end plates 34 and 36.

FIG. 3 is an exploded view of a bipolar plate according to one embodiment of the present invention. Polymer support plate 40 of an engineering thermoplastic such as polycarbonate or polysulfone, is formed with intersecting flow channels 42 and 44, where each flow channel has a depth at least greater than one half the thickness of polymer support plate 40. There is a resulting opening through support plate 40 where flow channels 42 and 44 intersect. Thin conductive foils 46 and 48 are then press fit into their mating flow channels 42 and 44, respectively. Foils 46 and 48 are pressed into flow channels 42 and 44, respectively, and formed into electrical contact with one another at the openings formed by intersecting flow channels 42 and 44 so that a series electrical connection is attained. Polymer support plate 40 may, also form frame area 41 and manifold 43 to isolate conductive foils 46 and 48 from shunt currents.

FIG. 4 is an isometric plan view of bipolar plate 50. Vertical channels 52 are formed on one side of support plate 55 and horizontal channels 54 are formed on the other side. The terms "vertical" and "horizontal" are simply relative terms where channels 52 and 54 are formed perpendicular to one another. The intersections 56 of vertical channels 52 and horizontal channels 54 form openings through support plate 50 for use in forming parallel series electrical connections over a relatively large area so that the series resistance of the bipolar plate is low. Channels 52 and 54 may be machined into a solid plate or the entire plate may be formed by injection molding for high volume, low-cost production. Corrugated metal foils 58 an 62 are formed with corrugations corresponding to channels 52 and 54 respectively. Foils 58 and 62 form electrical contacts 64 through the sections of channels 52 and 54.

FIG. 5 is a cross-sectional view that depicts a completed bipolar plate. Support plate 55 is formed with perpendicular channels 52 and 54 with resulting penetrations through support plate 55. A first conductive foil 58 is pressed into channels 52 and a second conductive foil 62 is pressed into channels 54. Foils 58 and 62 are placed in electrical contact within the penetrations to form the assembled conductive bipolar plate 50.

In a laboratory embodiment, the polymer support plate was about 1.8 mm (0.070") thick and was machined with horizontal channels on one side (cathode) of the plate and vertical channels on the other side (anode). Since the depths of the channels overlap one another, regularly spaced openings occur wherever the channels intersect. The foils were formed of 50 micron (0.002") thick 316 stainless steel that was square pleated to form narrow channels (1 mm, or 0.040" wide) in registry with the support plate channels through which reactants can flow. The polymer plate is somewhat thinner than the combined height of the corrugations so that when the foils are pressed to each side of the polymer plate, metal-to-metal contact occurs through the openings of the plate to provide the necessary electrical connections while maintaining segregation of the reactants on the opposite side of the bipolar plate assembly.

Thin foil structures alone would tend to be crushed by the clamping pressures typically used to clamp cell arrays of polymer electrolyte fuel cells. For example, a self-standing, pleated 316 stainless steel foil of the form and dimensions described above distorts significantly under pressure and finally collapses under a 300 psi clamping pressure. However, even higher clamping pressures are often desirable for improved polymer electrolyte fuel cell performance. For example, one catalyzed membrane supplier (W. L. Gore & Assoc.) suggests a clamping pressure of 700 psi for their polymer electrolyte composite membrane products. In order to prevent collapse, the foils are arrayed on either side of the formed polymer support plate, according to this invention. The polymer support provides the structural component that withstands the clamping pressures. Manifold penetrations and channels at the top and bottom of the plate direct reactant flows across the anode side of the plate. The horizontal channels 48, as shown in FIG. 3, are externally manifolded, although internal manifolds could also be provided as shown for the vertical-channels 42. The design of manifolds to supply the reactant channels is within the ordinary skill of fuel cell designers and is dependant on the particular fuel cell application, size, reactants, and the like.

The foil on the internally manifolded side of the cell must be sealed against the polymer support plate in some manner (not shown in the drawings) to prevent leakage or mixing of the reactants. In the laboratory embodiments, this was accomplished by the provision of a shallow channel in the polymer support plate near the periphery of the overlapping foil. This shallow channel was filled with a bead of flexible epoxy (Type 2216 B/A Gray from 3M) and then the components were clamped together in a heated press to hasten the epoxy cure. The periphery of the metal foil was then bonded to the polymer support plate with its center left free to float to accommodate any stresses that may occur during heating or clamping. A flexible adhesive is preferable because of the flexibility of the plate and the differing nature and thermal expansion coefficients of the two materials being joined. Hot melt adhesives also provide durable and effective seals. While difficult to use by hand, such materials should be more conducive to a manufacturing process.

This approach has been used for stacks with 300 $cm^2$ active areas that operate at ambient pressure. These ambient pressure stacks use separate water and hydrogen channel networks on the internally manifolded anode side so that the header/manifold portion of the plate is more complicated than shown in FIG. 3, but the principle is the same.

Single cells implementing this bipolar plate technology have been assembled and tested. Stable resistances as low as 0.16 ohm-$cm^2$ have been attained, confirming that reasonable electrical contact is achieved between the foils. In short-term testing, single cells operating on $H_2$/air at ambient pressure have produced current densities of approximately 0.3 A/$cm^2$ at 0.7 V. This is comparable to the performances attained with graphite plates in 100 $cm^2$ active area cells and stacks using the same ambient pressure operating scheme. Very thin unit cells are achieved with the pleated foil approach even though the active areas are relatively large. The plate plus membrane electrode assembly in this case was only 2.2 mm thick. With a modest 0.21 W/$cm^2$, this yields a volumetric power density of the active area approaching 1 kW/L using ambient pressure.

Since the pleated foil provides only straight channels, any special flow-field configurations, such as used in the ambient pressure stack, require that the network routing occur in the polymer regions of the flow-field in the manifold-header region. For example, multiple parallel serpentine channels can be accomplished by limiting the foil area to the straight sections with the curves in the plastic manifold region that allow the individual channels to double back the opposite direction to meet up with a new pleat channel. On the other hand, stamped or hydroformed foils can be configured with any manner of channeled flow-field design with all curves, etc., within the metal foil, or active, region. The one caveat with the flow-field design with the formed case is that the channels should be nearly perpendicular to the channels on the opposite face as frequently as possible so as to maximize the number of potential metal-to-metal contact points at the bases of the foil channels.

One of the advantages with this approach for use with metal foils is that the manifold/header region is a non-conductive polymer. Shunt currents in a stack, should they occur, will primarily exist in and propagate from the manifold region. If metals are used in this area, they need to be well coated or otherwise protected from the corrosive effects of these shunt currents. Using a polymer in this region alleviates the shunt currents and better isolates the metal foils. A conductive, carbon-based gas-diffusion backing material can also be extended past the foil on those sides adjacent the manifold penetrations such that the more stable carbon material electronically cloaks the foil and bears the brunt of any shunt currents that are inadvertently generated between the cells.

Although the test polymer plates were machined from polycarbonate and polyetherimide materials, the plates can be readily injection molded using these or other polymers, or possibly using thermosetting materials. Many suitable plastics for injection molding are taught in the '188 patent, incorporated by reference. With injection molding and mass production, the unit costs for the polymer plates will be very low.

In a laboratory test, where a 300 $cm^2$ active area plate was clamped between two current collector plates with pressures in the +300 psi range, areal resistivities were measured on the order of 0.03 ohm-$cm^2$. The resistance contribution of the current flow through the 50 micron thickness of the foil from the tops of the flow-field ribs to the bases of the channels are calculated to be negligible even for the rather poorly conducting stainless steels. As such, most of the resistive losses appear to stem from the interfacial contacts between the foils and between the foils and the collector plates. Indeed, the conductivities can be further improved by treating the interfacial areas of the otherwise untreated foils with abrasive paper.

While the faces of the foils may see as much as 700 psi contact force in a typical cell, the foil/foil interface relies upon the spring force of the foil to maintain pressure and a good contact. Spot-welding the two foils together in place on the polymer plate attains a more permanent bond. Spot welds also would hold the assembly together during plate assembly and sealing. Automatic spot welders or multi-headed spot welders can readily be incorporated into a mass production operation.

The foils were corrugated or pleated simply by running the foils through a pair of matched gear rollers with meshing teeth of the desired size and shape. Corrugation is a relatively inexpensive and high-yield process that is ideal for low-cost mass production. While the corrugation machine used in the laboratory experiments is designed to provide square pleats, in reality, the shape is slightly rounded such that some deformation is required to flatten the foil against the top of the polymer support ribs. The force required is on the order of several hundred psi. This may be useful to provide a deformable cushion to assure that areas of a stack that have not been compressed to the full degree, possibly due to variations in MEA thickness, etc., still compress the MEA to some degree such that the area is not rendered completely inactive. To some extent, it may be possible to use a rounded corrugation and let the compressive forces of the stack do the final shaping of the foil in situ.

Compared to similar size and thickness bipolar plates machined or otherwise formed out of solid stainless steel, the foil/polymer plates described here will typically weigh less than one quarter as much. While the initial trials have used untreated stainless steel, this approach also allows the use of metals that may not otherwise be practical because of cost or mechanical considerations. For example, titanium has been used in PEFCs although the material cost can be prohibitive for many potential applications. However, foils that are only 50 microns (0.002") thick, as used in this design, require on the order of $\frac{1}{10}$ the metal of other titanium designs. Also, many metals may not stamp or draw very well, but most can be readily pleated.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A bipolar plate for an electrochemical cell comprising;
   a polymer support plate defining first flow channels on a first side of the support plate and second flow channels on a second side of the support plate, where the first flow channels and second flow channels have intersecting locations and have a depth effective to form openings through the support plate at the intersecting locations;
   a first foil of electrically conductive material pressed into the first flow channels; and
   a second foil of electrically conductive material pressed into the second flow channels so that electrical contact is made between the first and second foils at the opening through the support plate.

2. A bipolar plate according to claim 1, wherein the majority of first flow channels are perpendicular to the second flow channels.

3. A bipolar plate according to claim 1, wherein the polymer support plate is injection molded to form the first and second flow channels.

4. A bipolar plate according to claim 3, wherein the majority of first flow channels are perpendicular to the second flow channels.

5. A bipolar plate according to claim 1, wherein the polymer support plate includes manifold and seal areas that are not contacted by the first and second foils.

6. A fuel cell assembly comprising:
   a membrane electrode assembly with anode and cathode surfaces;
   first and second bipolar plates adjacent the anode and cathode surfaces, where each bipolar plate comprises a polymer support plate defining first flow channels on a first side of the support plate and second flow channels on a second side of the support plate, where the first flow channels and second flow channels have intersecting locations and have a depth effective to form openings through the support plate at the intersecting locations;
   a first foil of electrically conductive material pressed into the first flow channels; and
   a second foil of electrically conductive material pressed into the second flow channels so that electrical contact is made between the first and second foils at the opening through the support plate.

7. A fuel cell assembly according to claim 6, wherein the majority of first flow channels are perpendicular to the second flow channels.

8. A fuel cell assembly according to claim 6, wherein the polymer support plate is injection molded to form the first and second flow channels.

9. A fuel cell assembly according to claim 8, wherein the majority of first flow channels are perpendicular to the second flow channels.

10. A fuel cell assembly according to claim 6, wherein the polymer support plate includes manifold and seal areas that are not contacted by the first and second foils.

11. A fuel cell assembly according to claim 6, wherein the anode and cathode surfaces have an area greater than the first and second foils.

* * * * *